US009467643B2

(12) United States Patent
Miller et al.

(10) Patent No.: US 9,467,643 B2
(45) Date of Patent: Oct. 11, 2016

(54) EVENT RECORDER PLAYBACK WITH INTEGRATED GPS MAPPING

(71) Applicant: Progress Rail Services Corporation, Albertville, AL (US)

(72) Inventors: Marc David Miller, Lee's Summit, MO (US); Steven Keith Kirby, Holden, MO (US); Gregory Richard Bressler, Summerdale, PA (US)

(73) Assignee: Progress Rail Services Corporation, Albertville, AL (US)

( * ) Notice: Subject to any disclaimer, the term of this patent is extended or adjusted under 35 U.S.C. 154(b) by 17 days.

(21) Appl. No.: 14/147,810

(22) Filed: Jan. 6, 2014

(65) Prior Publication Data

US 2015/0195483 A1 Jul. 9, 2015

(51) Int. Cl.

| | | |
|---|---|---|
| H04N 5/932 | (2006.01) |
| H04N 5/935 | (2006.01) |
| H04N 5/77 | (2006.01) |
| H04N 5/93 | (2006.01) |
| G11B 27/00 | (2006.01) |
| H04N 5/91 | (2006.01) |
| B61L 3/00 | (2006.01) |
| B61L 27/00 | (2006.01) |
| H04N 9/82 | (2006.01) |
| H04N 5/775 | (2006.01) |
| H04N 9/80 | (2006.01) |

(52) U.S. Cl.
CPC ............... *H04N 5/91* (2013.01); *B61L 3/002* (2013.01); *B61L 27/0055* (2013.01); *H04N 5/77* (2013.01); *H04N 9/8205* (2013.01)

(58) Field of Classification Search
USPC ....... 386/201, 224, 227, 228, 229, 230, 239, 386/240, 241, 243, 278, 280, 282
See application file for complete search history.

(56) References Cited

U.S. PATENT DOCUMENTS

| | | | |
|---|---|---|---|
| 7,188,341 B1 | 3/2007 | Hawthorne et al. |
| 7,965,312 B2 | 6/2011 | Chung et al. |
| 2009/0157255 A1 | 6/2009 | Plante |
| 2014/0331136 A1* | 11/2014 | Desmons ................... 715/719 |

FOREIGN PATENT DOCUMENTS

| | | | |
|---|---|---|---|
| DE | 102004015222 | 10/2005 |
| JP | 2006-090850 | * 4/2006 | ............. G01C 21/00 |
| WO | WO 2007/064671 | 6/2007 |

OTHER PUBLICATIONS

Machine Translation of JP 2006-090850, Apr. 2006, JP, Toyoda Akio.*
Railhead Corp., "Railhead Vision Systems Locomotive Digital Video Recorder (LDVR)" brochure, 2 pages.

* cited by examiner

*Primary Examiner* — Daquan Zhao
(74) *Attorney, Agent, or Firm* — Finnegan, Henderson, Farabow, Garrett & Dunner, LLP

(57) ABSTRACT

A computer-implemented method includes enabling a user of event recorder playback software to select a past time segment of recorded locomotive event data. The method includes presenting recorded video data recorded by one or more cameras on the locomotive during the past time segment, presenting recorded GPS map data indicative of the geographical position of the locomotive during the past time segment, and presenting recorded locomotive operational data recorded during the past time segment. The presentations of recorded video data, recorded GPS map data, and recorded locomotive operational data are synchronized based on a common attribute associated with all of the recorded data. Implementation of a select animation process to one or more of the presentations of recorded data results in the simultaneous implementation of the same select animation process to another of the presentations of recorded data.

15 Claims, 3 Drawing Sheets

EVENT RECORDER PLAYBACK WITH INTEGRATED GPS MAPPING

TECHNICAL FIELD

The present disclosure relates generally to event recorder playback and, more particularly, event recorder playback with integrated GPS mapping.

BACKGROUND

Event recorders provided on various mobile vehicles, such as planes and trains, are generally designed to record data associated with an event during operation of the vehicle. The event recorders are typically designed and built to store that recorded data in a crash-hardened memory unit. A crash-hardened memory unit is configured to withstand the severe conditions that may occur during an accident. The memory units for these event recorders are contained within enclosures that allow the stored data to remain intact after accidents or other abnormal events. An important purpose of the event recorder is to provide a source of data that can be retrieved from the event recorder after an event such as an accident, and provide a detailed and accurate accounting of exactly what happened leading up to and during the event.

On-scene investigations after events involving mobile vehicles are time consuming and are not always accurate. Often, investigators must rely on witness statements and approximations to assess the events and the relative timing of the events leading up to the accident and to determine who is at fault. It is therefore difficult to guarantee the correctness of these assessments. Insurance companies use these assessments to determine who must pay for the damage after an accident has occurred. Incorrect assessments lead to money being spent unnecessarily by the insurance companies whose clients were not at fault.

A system capable of recording, reproducing and analyzing information pertaining to an accident is very valuable. Investigations would be more accurate since the system will provide precise data prior to, during, and after the accident. Additionally, insurance companies will benefit due to improved investigation assessments. Existing event recorders often are capable of recording only specific types of data such as limited amounts of video and/or audio data, or data provided by sensors that measure vehicle operating characteristics. During accident reconstruction, the various types of data must be synchronized after the fact by stitching together the different types of data relative to different time sources associated with each of the different types of data. This process requires complex software and may lead to inaccuracies in the perceived relative timing of different recorded data.

An integrated diagnostic, telemetry, and recording system for use with a locomotive is disclosed in U.S. Pat. No. 7,965,312 of Chung et al. that issued on Jun. 21, 2011 (the '312 patent). The '312 patent discloses an imaging system that generates landmark correlated images taken from a locomotive and logs the recorded information with one or more data tags, such as tags indicative of time, operating conditions, and/or location. The event recorder of the '312 patent records and transmits video, geographic data, and locomotive operating parameters, and the data may be sent to an off-board data monitoring center based on certain conditions or geographic locations.

Although the system of the '312 patent may improve safety and aid in investigations regarding the operation of a locomotive, it may be less than optimal. In particular, the disclosed system of the '312 patent does not provide a system that allows for easy comparison of multiple types of data that are synchronized and displayed on a common display.

The system and method of the present disclosure solves one or more problems set forth above and/or other problems in the art.

SUMMARY

In one aspect, the present disclosure is directed to an event recorder playback system. The system may include a controller, with the controller configured to receive recorded data comprising video data, GPS map data, and operational data associated with operation of a locomotive during a trip. The recorded data may include tagged metadata. The controller may process the recorded data by using the tagged metadata to synchronize the recorded data. The controller may also coordinate an animation of at least a portion of the synchronized recorded data such that implementation of a select animation process to one of the recorded video data, GPS map data, and operational data results in the simultaneous implementation of the same select animation process to another of the recorded video data, GPS map data, and operational data. The event recorder playback system may also include a user console that is configured to display the coordinated animation of at least a portion of the synchronized video data, GPS map data, and operational data.

In another aspect, the present disclosure is directed to a computer-implemented method that may include enabling a user of event recorder playback software configured to present a display at a user console to select a past time segment of recorded locomotive event data. The method may also include presenting recorded video data recorded by one or more cameras on the locomotive during the past time segment, presenting recorded GPS map data indicative of the geographical position of the locomotive during the past time segment, and presenting a graphical display of recorded locomotive operational data recorded during the past time segment. The method may also include synchronizing the presentations of recorded video data, recorded GPS map data, and the graphical display of recorded locomotive operational parameters based on a common attribute associated with all of the recorded data. The method may further include coordinating an animation of at least a portion of the synchronized presentations of recorded video data, recorded GPS data, and recorded locomotive operational data such that implementation of a select animation process to one or more of the presentations of recorded data results in the simultaneous implementation of the same select animation process to another of the presentations of recorded data.

In still another aspect, the present disclosure is directed to a non-transitory computer-readable data storage medium storing program code operable to cause a user console to perform operations on data recorded by an event recorder associated with a locomotive during a trip by the locomotive. The operations may include enabling a user of the user console to select a past time segment of recorded locomotive event data, presenting recorded video data recorded by one or more cameras on the locomotive during the past time segment, presenting recorded GPS map data indicative of the geographical position of the locomotive during the past time segment, and presenting a graphical display of recorded locomotive operational parameters recorded during the past time segment. The operations may also include synchronizing the presentations of recorded video data, recorded GPS map data, and the graphical display of recorded locomotive operational data based on a common attribute associated with all of the recorded data. The operations may further include coordinating an animation of at least a portion of the synchronized presentations of recorded video data, recorded GPS data, and recorded locomotive operational data such that implementation of a select animation process to one or more of the presentations of recorded data results in a simultaneous implementation of the same select animation process to another of the presentations of recorded data.

DETAILED DESCRIPTION

Figure 1:
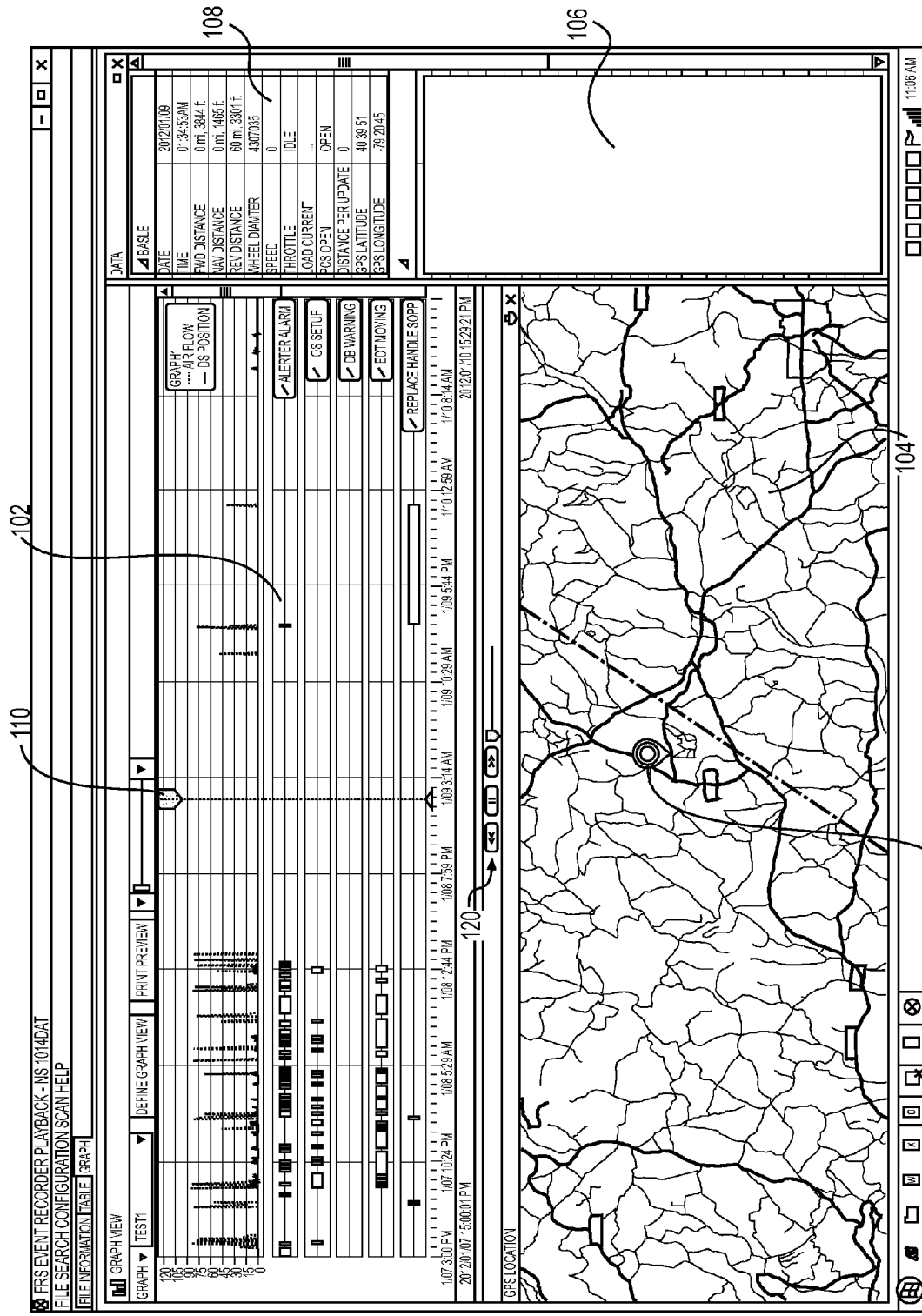
FIG. 1 is a screen shot from an exemplary disclosed user console configured for playing back event recorder data.

FIG. 1 illustrates an exemplary screen shot from a user console 100 configured for displaying data recorded by an event recorder. User console 100 may include an electronic display with a graphical user interface (GUI) implemented on any of a variety of computing devices. The various types of computing devices may include, but are not limited to, a laptop computing device, a personal computer (PC) device, a touch-screen computing device, a tablet computer, a personal digital assistant (PDA), a smartphone, or a dedicated event recorder playback device.

As shown in FIG. 1, user console 100 may be divided into sections or areas that may be fixed in size and relationship to each other, or provided as windows that may be reconfigured, resized, and repositioned relative to each other using a GUI manager. In various implementations, the areas may include a graphical display area 102 in which data indicative of locomotive operational parameters may be displayed in graphical form. A controller (not shown) associated with user console 100 may be configured to retrieve data recorded by an event recorder on or associated with a locomotive. The data may be retrieved in real time, such as over a wireless, wired, or combination wireless and wired network connected to the event recorder. Alternatively or in addition, the data may be retrieved from data storage medium that has been removed from the event recorder, or to which data from the event recorder has been transferred. A display area 104 of user console 100 may include Global Positioning System (GPS) map data of the geographical area within which the locomotive was traveling while the data indicative of locomotive operational parameters was being recorded. Another display area 106 of user console 100 may be provided for the display of video data captured by one or more cameras mounted on the locomotive. At least some of the data indicative of locomotive operational parameters may also be presented on user console 100 in tabular form within yet another display area 108 of user console 100.

The various types of computing devices that include user console 100 may be provided with software applications, or may access these software applications from external sources over a real-time communication network such as the Internet. Application Programming Interfaces (API) may be provided between the software applications and GUI software to provide a user of the device with certain features and operations. A user may desire certain operations such as scrolling, selecting, gesturing, zooming, and other animating operations for the presentations of data on user console 100. The data being presented in the various display areas of user console 100 may be synchronized based on a common attribute associated with all of the stored data. Common attributes may include a universal time stamp that is associated with each of the types of data being presented. The universal time stamp may be included as metadata, which is data that is descriptive of the data to which it is attached. Other examples of the types of metadata that may be attached to or associated with the data being presented may include information relating to a particular landmark or geographical position at or near which the data was being recorded.

A controller associated with user console 100 may be configured to coordinate an animation of at least a portion of the synchronized presentations of stored video data, stored GPS data, and stored locomotive operational parameters. Implementation of a select animation process such as scrolling across a portion of data displayed in area 102 may result in the simultaneous implementation of the same process of scrolling across a corresponding portion of GPS map data displayed in area 104. Similarly, implementation of a scrolling process to one or more of the presentations of stored locomotive operational parameters and GPS map data may result in the simultaneous scrolling through video data being presented in display area 106. Scrolling is one possible animation process implemented on the presentation of content on user console 100. Scrolling is the act of sliding a directional (e.g., horizontal or vertical) presentation of content, such as text, drawings, or images, across a screen or display window. As shown in FIG. 1, scrolling through the locomotive operational parameters graphically presented in display area 102 of user console 100 may be done with the help of a scrollbar 110, or by using keyboard shortcuts such as through the use of arrow keys. A vertical line marker (VLM) is shown extending vertically across display area 102 from scrollbar 110. In the exemplary display of FIG. 1, a time bar is presented across the bottom of display area 102, and scrolling across the display using scrollbar 110 results in the presentation of data recorded at different times during the operation of the locomotive. A player 120 may also be included with one or more of the display areas of console 100, such as shown at the bottom of display area 102 in FIG. 1. The controller associated with user console 100 may be configured to enable the various features of player 120 such that scrolling of the VLM extending across display area 102 may be automated. Player 120 may include a reverse button (indicated by << in FIG. 1), a pause button (indicated by ||), a forward button (indicated by >>), and a slider bar. The functions of each of these controls, as seen from the left of player 120 in FIG. 1, are to play in reverse (by automatically moving the VLM to the left), pause the play (by stopping movement of the VLM), play forward (by automatically moving the VLM to the right), and adjusting how fast the VLM moves by adjusting the slider bar shown to the right of the forward button. The controller associated with user console 100 may be configured to implement simultaneous scrolling across GPS map data presented in area 104. The simultaneously displayed GPS map data illustrates the geographical location of the locomotive on a map during the time period when locomotive operational parameters being displayed in area 102 were recorded.

Zooming is another animation process that may be implemented in the presentation of content on user console 100. Zooming involves a change in the scale of the data that is being observed at any particular point in time. As one example, a user may desire to zoom in on data recorded when the locomotive was at or near a particular position designated by a cursor 112 in the GPS map display area 104. This may allow the user to expand the scale of the presentation of data recorded at that position for closer examination. The user may achieve the desired results through various keyboard shortcuts or other processes such as movement of a slider bar, or gesturing by the user through inputs on a touch screen at two or more input points. Animation operations in general include changing the presentation of content on user console 100 within a given time period. The controller associated with user console 100 may be configured to simultaneously display zooming in or out on a particular segment of the GPS map data presented in area 104 with zooming in or out on the corresponding time segment of recorded data being displayed in area 102.

A time period of data recorded by an event recorder on the locomotive may be selected based at least partially upon a length of time before an event, such as an accident, that may include significant data or signals potentially relevant to determining the cause of the event. Data or signals that may be considered significant or relevant to determining the cause of an event may be data indicative of parameters, characteristics, or commands, but for the existence of which, the event would most likely not have happened. A determination of which data may be relevant to determining the cause of an event may be based at least in part on one or more of empirical data and historical data. In the case of an event recorder mounted on a locomotive, significant data or signals may include data indicative of locomotive operating parameters, locomotive control signals, locomotive performance characteristics, and sounds and sights both internal to and external to the locomotive as detected by audio and video sensors. Other significant data may be indicative of engine operating parameters, exhaust characteristics, and electrical parameters. Operator or central control commands and other wireless signals or wired signals provided over multi-unit (MU) trainline communication buses may also be provided to the controller associated with user console 100. Still further significant data may include data indicative of environmental conditions, geographical location, or other unusual conditions or events exterior to the vehicle on which the integrated event recorder is mounted.

One or more controllers associated with user console 100 may embody single or multiple microprocessors that may form one or more modules configured (e.g., programmed) for requesting and/or receiving various types of data. The various types of data may include video data and audio data. Other types of data may include locomotive data indicative of one or more locomotive operating parameters, locomotive control signals, and locomotive performance characteristics. Engine operating and performance data may also be requested and received by the controllers and displayed graphically in display area 102 of console 100. Additional types of data may include, but are not limited to electrical data, exhaust characteristics, and positive train control (PTC) data. PTC data is indicative of the actual location of a train at all times, such as may be obtained from one or more global positioning system (GPS) sensors, and autonomous command signals that implement control of the actual location of the train and where the train is allowed to move for safety reasons. One or more controllers associated with the event recorder may also be configured for associating and encoding a universal time stamp derived from a common time source with each of the various types of data in order to enable real-time synchronization of all the recorded data when re-creating an event on user console 100. By associating a universal time stamp with all of the various types of data received by the event recorder controller, the controller may avoid the need to stitch together the various types of data after the data has been separately recorded and associated with separate time sources that may not reflect exactly the same time. As one non-limiting example, an event recorder controller may receive frames of video and/or audio data from an internet protocol (IP) camera mounted at the front of the train, and record that data side-by-side with other types of data received at the same point in time. The point in time associated with each of the different types of data may be a universal time stamp in that it is derived from a common time source for all of the types of data. The other types of data may include the sound of a train horn, actuation of a brake lever by an operator, a signal received from a GPS sensor, a change in throttle setting, a sudden change in exhaust characteristics, the position of the train relative to a train crossing, and the speed and acceleration or deceleration of the train.

Figure 2:
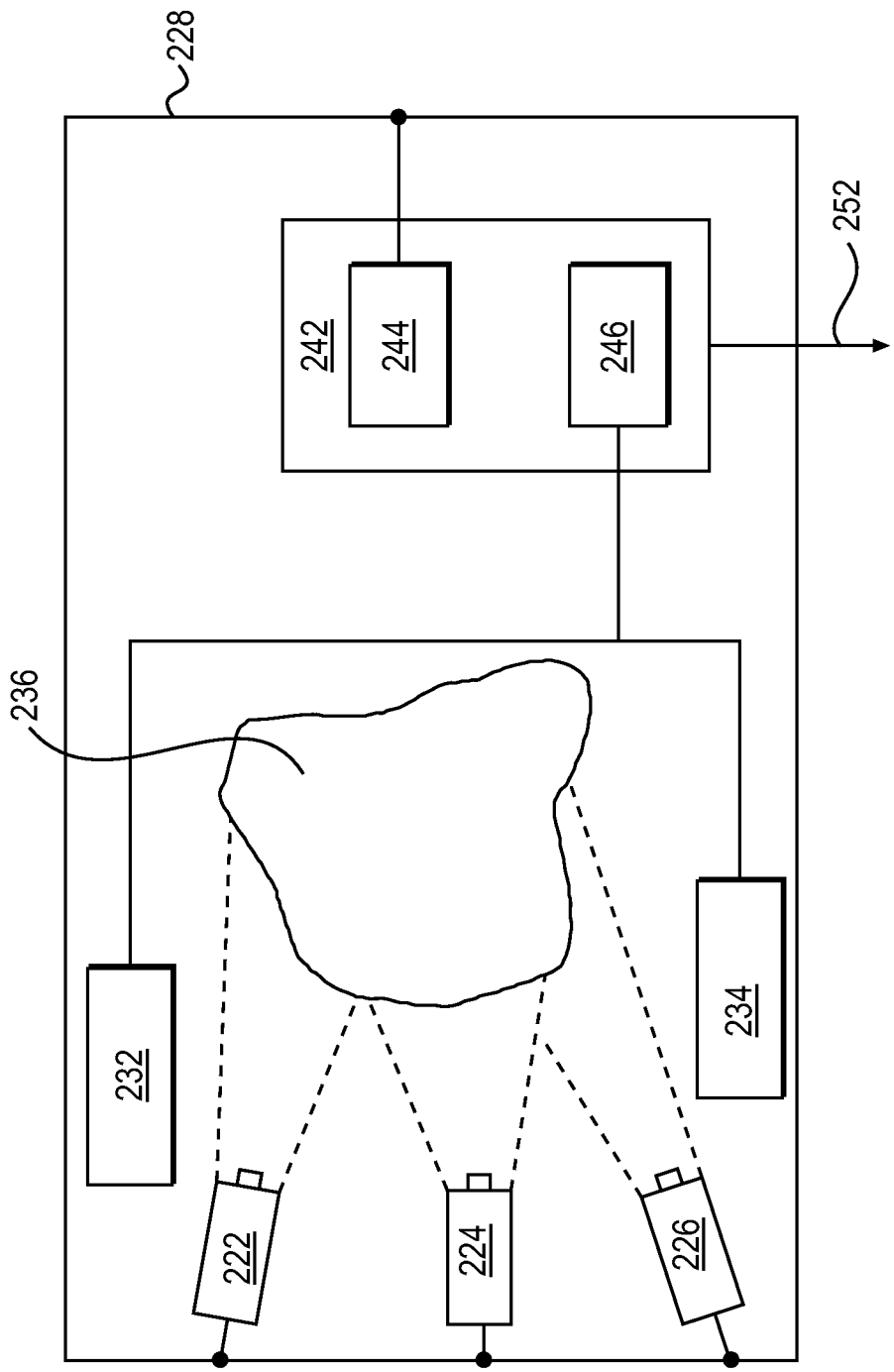
FIG. 2 depicts a representation of an exemplary event recording system configured for recording event data that can be displayed by the exemplary user console of FIG. 1.

As shown in FIG. 2, an exemplary event recording system may include various recording and measuring devices. In the example of FIG. 2, the system includes video cameras 222, 224, and 226. However, the system is scalable and can support any number of cameras, from one to many. The cameras can be positioned to record an environment that is within the field of view of the cameras. FIG. 2 illustrates all three video cameras recording video data from an event data source 236. Event data source 236 may represent an area encompassing a field of view in front of the lead locomotive of a consist of locomotives and extending along the track. Alternative implementations may include one or more of the cameras recording video of areas to the sides of the locomotive, above or below the locomotive, behind the locomotive, or inside the locomotive cab. Cameras positioned to record video data from inside the locomotive cab may provide a record of operator actions and/or the positions of controls and gauges on one or more control panels. In some examples, each camera may pan, tilt, and zoom to change the field of view. Each camera may also include a microphone to acquire audio data or to trigger the recording of data from event data source 236. As one example, the blowing of the train horn as the train approaches a crossing may trigger the recording of data by the cameras.

The system 100 may also include a locomotive operational data source 232. This data source is represented in FIG. 2 as a single block, but may include one or more sensors, alarms, or other devices that detect engine operating and performance data, electrical data, throttle control data, air and fuel pressures, brake activation, exhaust characteristics, and PTC data. A GPS map data source 234 may be provided to generate an indication of the current position of the locomotive on a map of the geography along the track on which the train is traveling at the time the data is being recorded. GPS map data source 234 may be provided as part of the event recorder system, or may include data received from sources external to the event recorder. GPS map data may be received from preexisting data sources, including a library of GPS maps for the region in which the train is traveling. One or more GPS sensors mounted on the locomotive may provide data on the exact location of the locomotive relative to a preexisting map at any particular point in time. Each data source can also associate the detected data with a time period of occurrence. Data collected by the various data sources can be sensor data collected automatically and at specific time periods (e.g. once a second). Alternatively or in addition, data may be collected in association with alarm messages, commands received from an onboard operator, commands received from a central command center, or other initiating events. A common attribute such as a universal time stamp or the presence of a landmark or geographical position may be associated with all of the types of detected data, and may be included as metadata attached to the data.

Cameras 222, 224, and 226, locomotive operational parameters data source 232, and GPS map data source 234 may be positioned and configured to record data acquired within the physical and temporal range of an event or series of events. The cameras may record audio-visual data and transmit audio-visual data streams 228 to audio-visual data storage 244 within a server 242 (e.g., a crash-hardened solid state drive). The server 242 may also comprise locomotive operational parameters data storage 246. In various implementations, such as illustrated in FIG. 2, data storage 246 may also acquire GPS map data associated with the geographical position of the locomotive when the operational parameters are being detected and recorded. One of ordinary skill in the art will recognize that the functions of server 242 could be performed by any number of microprocessors and/or memory devices positioned in an event recorder and/or connected to the event recorder through a network. As shown in FIG. 2, the data recorded by server 242 of an event recorder may be communicated to a data processing application over communication path 252. This transmission of data over path 252 may occur in real time via a wireless, wired, or combination wireless/wired network. Alternatively or in addition, data may be transferred from server 242 after an event, such as when the data is downloaded from an event recorder recovered from an accident site. A data processing application may receive data from the server 242 (from both audio-visual data storage 244 and locomotive operational parameters data storage 246), process the data, and generate an output that can be used to drive the GUI displayed on user console 100, shown in FIG. 1.

Data presented on user console 100 can be displayed in a variety of formats such as graphical, textual, or video format. The display areas of user console 100 can have a number of shapes, sizes, aspect ratios, and settings. The video display area 106 can also display more than one video clip. For example, three different video clips associated with cameras 222, 224, and 226 pointed in three different directions could be displayed. At least the display area 102 for presenting the recorded locomotive operational parameters may be provided with a time bar. Movement of scrollbar 110 along the time bar allows a user to select a current time of interest. The time bar may span a range of time that covers all or less than all of the time during which a train was moving along a particular length of track. This time period may cover many hours, and therefore the corresponding GPS map data displayed in area 104 may cover a large geographical area. A user can change the position of scrollbar 110 in display area 102, or the position of cursor 112 in display area 104 in order to indicate a new time or geographical position of interest.

A controller associated with user console 100 may be further configured to display real-time data being acquired by and transmitted from various sensors and other data sources on and off of the train. This real-time data may be in addition to the data downloaded from data storage 244, 246 of the server 242 of an event recorder. The controller associated with user console 100 may be configured to receive data that is being transmitted over a communication network, either wirelessly, over a wired communication path, or by a combination of wireless and wired communication paths. This feature may facilitate operation or diagnostics of the locomotive in addition to the reconstruction of an event such as an accident. Various sensor and data sources may provide the video/audio data, locomotive operational parameters data, and GPS map data. One source may be a locomotive control system that provides data about the operational performance and status of the locomotive. For example, a locomotive control system may provide data on power commands, engine speed, locomotive speed, traction feedback, pneumatic brakes, brake pressures, dynamic braking, load, throttle, operating faults, ambient temperature, commanded parameters and the like. Another data source may be the multi-unit (MU) cables or trainlines that run between locomotives in a train and provide operation status and carry command and control signals. For example, the MU cables may carry signals that include data on an operator's power/brake commands, direction calls, power modes, and the like. Moreover, data can also be collected directly from various locomotive and environmental sensors, control circuits and devices, track geometry monitors, smoke and fire detectors, chemical or fuel detectors, engine-on relays and emergency brake relays, locomotive horn and bell indications, hot wheel or hot bearing sensors, and impact sensors. Other environmental and operational parameters that may be observed and recorded may include, but are not limited to, weather conditions, track conditions, track topology, elevation direction and heading.

Figure 3:
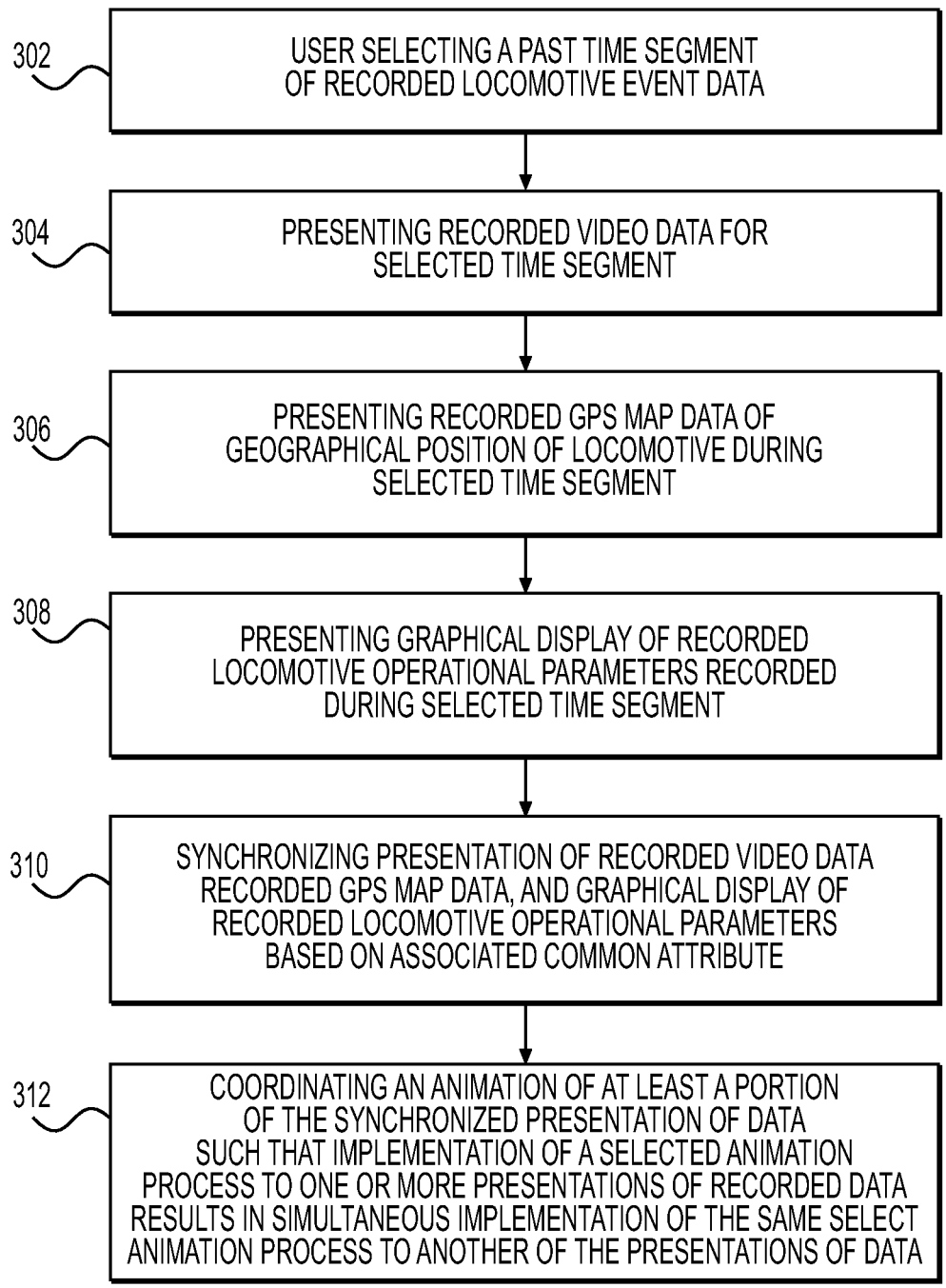
FIG. 3 is a flowchart illustrating exemplary steps that may be performed by the exemplary user console of FIG. 1.

FIG. 3 illustrates steps of an exemplary disclosed method that may be performed on a user console 100 during the playback of data recorded with an event recorder in accordance with various aspects of the disclosure. FIG. 3 will be discussed in the following section in order to further illustrate the disclosed concepts.

INDUSTRIAL APPLICABILITY

The disclosed system and method for playback of event recorder data may enhance the ability of a user to derive useful information from the replay of data associated with a locomotive event. Various types of data recorded by an event recorder on a locomotive prior to, during, and following an event may be synchronized by at least one common attribute associated with the event. During the replay of the synchronized event data an exemplary method may include coordinating animations of portions of the synchronized presentations of data on user console 100. Coordinated animations of select portions of the synchronized presentations of data may enhance the ability to investigate and determine the exact causes or contributing factors for different locomotive events.

FIG. 3 depicts a flow chart for an implementation of an exemplary method of replaying recorded locomotive event data. At step 302, a past time segment of recorded locomotive event data may be selected. The time segment may be selected by first moving scrollbar 110 along the time bar of display area 102 until recorded locomotive operational parameters falling within a range of interest are observed. A controller associated with operator console 100 may implement the simultaneous scrolling of GPS map data displayed in area 104. Similarly, a display of recorded video presented in area 106 may be simultaneously scrolled (forward or backward) to show video recorded at the same time period as the operational parameters, and at the same locomotive location as displayed on the GPS map data of area 104. This feature allows an operator to make a selection of a past time segment of interest based on any one of several different displays of synchronized data presented on user console 100. The selection may be based on an idea of approximately when an event of interest occurred. Alternatively or in addition, the selection may be based at least partially on the observation of an operational parameter in area 102 that is unusual, a tabulated value in area 108 that is outside an expected range, or video in area 106 that is unusual.

Step 304 may include presenting recorded video data for the selected time segment. A user may control the presentation of recorded video data by scrolling forward or backward in time while viewing the video data until an event of interest is observed. As one example, an event associated with the locomotive may include a large object such as a truck or other vehicle striking the locomotive. The exact point in time at which the event occurred may not be known, so it may be necessary during the replay of event data on user console 100 to fast forward through the recorded video data until seeing the frame or frames where impact occurred.

Step 306 may include presenting recorded GPS map data of the geographical position of the locomotive during the selected time segment. The initial scale at which the GPS map data is presented in area 104 of user console 100 may not allow for detailed viewing of the exact terrain at any particular point in time. This may be the result of presenting GPS map data in area 104 for an extended period of time over which the locomotive has traveled a long distance. During an investigation of an event it may be desirable to zoom in on a relatively short section of track to determine whether the grade or other geographical features at that location may have been a contributing factor.

Step 308 may include presenting a graphical display of recorded locomotive operational data recorded during the selected time segment. In one exemplary implementation, display area 102 of user console 100 may include the graphical display of various parameters. The recorded data may be presented with the magnitudes or quantities of the parameters along the y-axis of the graph, and the time at which each magnitude or quantity was recorded presented along a time bar on the x-axis of the graph. During an investigation of an event, a user may move scrollbar 110 along the time bar of the x-axis in area 102 until spotting a significant spike in the presentation of data that may be indicative of a factor contributing to the cause of the event.

Step 310 may include synchronizing the presentation of recorded video data, recorded GPS map data, and the graphical display of recorded locomotive operational data based on an associated common attribute. As discussed above, this synchronization may be enabled by having associated a common attribute such as a universal time stamp with each of the types of data as the data was recorded by an event recorder. Other common attributes may include proximity to a common landmark or other geographical position when the different types of data are recorded. Identifying information such as one or more of these common attributes may be tagged or associated with the recorded data as metadata.

Step 312 may include coordinating an animation of at least a portion of the synchronized presentations of data such that implementation of a select animation process to one or more presentations of recorded data results in the simultaneous implementation of the same select animation process to another of the presentations of data. As discussed above, various animation processes may include scrolling through the presented data in any one of the display areas, and zooming in or out within one or more display areas to change the scale of the presented data.

It will be apparent to those skilled in the art that various modifications and variations can be made to the disclosed system and method without departing from the scope of the disclosure. Other implementations of the disclosed methods of playing back recorded event data will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. An event recorder playback system, comprising:
   a controller configured to:
   receive recorded data comprising video data, GPS map data, and operational data associated with operation of a locomotive during a trip, the recorded data including tagged metadata;
   process the recorded data by using the tagged metadata to synchronize the recorded data; and
   coordinate an animation of at least a portion of the synchronized recorded data such that implementation of a select animation process to one of the recorded video data, recorded GPS map data, and recorded operational data results in a simultaneous implementation of the same select animation process to another of the recorded video data, recorded GPS map data, and recorded operational data; and
   a user console configured to display coordinated animation of at least a portion of the synchronized video data, GPS map data, and operational data;
   wherein the controller is further configured to;
   coordinate the animation of at least a portion of the synchronized recorded data by implementing scrolling of at least one of the types of recorded data being displayed on the user console simultaneously with scrolling of another one of the types of recorded data being displayed on the user console, and
   coordinate the animation of at least a portion of the synchronized recorded data by implementing zooming in or out on at least one of the types of recorded data being displayed on the user console simultaneously with zooming in or out on another one of the types of recorded data being displayed on the user console.

2. The system of claim 1, wherein the controller is further configured to process the recorded data by using tagged metadata comprising a universal time stamp associated with the recorded data to synchronize the recorded data.

3. The system of claim 1, wherein the controller is further configured to process the recorded data by using tagged metadata comprising information on location of the locomotive relative to a landmark.

4. The system of claim 1, wherein the controller is further configured to coordinate scrolling of a portion of the recorded operational data with scrolling of a portion of the recorded GPS map data indicative of the location of the locomotive when the operational data was recorded.

5. The system of claim 1, wherein the controller is further configured to coordinate scrolling of at least one of the recorded operational data and the recorded GPS map data with scrolling of video data recorded by one or more cameras on the locomotive at approximately the same time as the recording of the at least one of the recorded operational data and the recorded GPS map data.

6. The system of claim 1, wherein the controller is further configured to coordinate zooming in or out on a portion of the recorded operational data with zooming in or out on a portion of the recorded GPS map data indicative of the location of the locomotive when the operational data was recorded.

7. The system of claim 1, wherein the controller is further configured to coordinate zooming in or out on at least one of the recorded operational data and the recorded GPS map data with zooming in or out on video data recorded by one or more cameras on the locomotive at approximately the same time as the recording of the at least one of the recorded operational data and the recorded GPS map data.

8. A computer-implemented method comprising:
enabling a user of event recorder playback software configured to present a display at a user console to select a past time segment of recorded locomotive event data;
presenting recorded video data recorded by one or more cameras on the locomotive during the past time segment;
presenting recorded GPS map data indicative of a geographical position of the locomotive during the past time segment;
presenting a graphical display of recorded locomotive operational data recorded during the past time segment;
synchronizing the presentations of recorded video data, recorded GPS map data, and the graphical display of recorded locomotive operational data based on a common attribute associated with all of the recorded data; and
coordinating an animation of at least a portion of the synchronized presentations of recorded video data, recorded GPS data, and recorded locomotive operational data such that implementation of a select animation process to one or more of the presentations of recorded data results in a simultaneous implementation of the same select animation process to another of the presentations of recorded data;
coordinating the animation of at least a portion of the synchronized presentations of recorded data by implementing scrolling of at least one of the types of recorded data being displayed on the user console simultaneously with scrolling of another one of the types of recorded data being displayed on the user console; and
coordinating the animation of at least a portion of the synchronized presentations of recorded data by implementing zooming in or out on at least one of the types of recorded data being displayed on the user console simultaneously with zooming in or out on another one of the types of recorded data being displayed on the user console.

9. The computer-implemented method of claim 8, further comprising:
synchronizing the presentations of recorded data by using tagged metadata comprising a universal time stamp associated with each of the types of recorded data.

10. The computer-implemented method of claim 8, further comprising:
synchronizing the presentations of recorded data by using tagged metadata comprising information on location of the locomotive relative to a landmark.

11. The computer-implemented method of claim 8, wherein scrolling of the recorded operational data is implemented simultaneously with scrolling of the recorded GPS map data indicative of the location of the locomotive when the operational data was recorded.

12. The computer-implemented method of claim 8, wherein scrolling of at least one of the recorded operational data and the recorded GPS map data is implemented simultaneously with scrolling of video data recorded by one or more cameras on the locomotive at approximately the same time as the recording of the at least one of the recorded operational data and the recorded GPS map data.

13. The computer-implemented method of claim 8, wherein zooming in or out on at least a portion of the recorded operational data is implemented simultaneously with zooming in or out on at least a portion of the recorded GPS map data indicative of the location of the locomotive when the operational data was recorded.

14. A non-transitory computer-readable data storage medium storing program code operable to cause a user console to perform operations on data recorded by an event recorder associated with a locomotive during a trip by the locomotive, the operations comprising:
enabling a user of the user console to select a past time segment of recorded locomotive event data;
presenting recorded video data recorded by one or more cameras on the locomotive during the past time segment;
presenting recorded GPS map data indicative of the geographical position of the locomotive during the past time segment;
presenting a graphical display of recorded locomotive operational data recorded during the past time segment;
synchronizing the presentations of recorded video data, recorded GPS map data, and the graphical display of recorded locomotive operational data based on a common attribute associated with all of the recorded data; and
coordinating the animation of at least a portion of the synchronized presentations of recorded data by implementing at least one of zooming in, and zooming out on at least one of the types of recorded data being displayed on the user console simultaneously with at least one of zooming in, and zooming out on another one of the types of recorded data being displayed on the user console.

15. The non-transitory computer-readable data storage medium of claim 14, further comprising stored program code operable to cause the user console to perform operations comprising synchronizing the presentations of recorded data by using tagged metadata comprising a universal time stamp associated with each of the types of recorded data.

* * * * *